(12) United States Patent
Tapp

(10) Patent No.: US 11,697,477 B2
(45) Date of Patent: Jul. 11, 2023

(54) SENSOR APPARATUS FOR A SAIL AND ASSOCIATED SYSTEM

(71) Applicant: Rachael Tamara Tapp, Newbridge (GB)

(72) Inventor: Rachael Tamara Tapp, Newbridge (GB)

( * ) Notice: Subject to any disclaimer, the term of this patent is extended or adjusted under 35 U.S.C. 154(b) by 1161 days.

(21) Appl. No.: 16/075,216

(22) PCT Filed: Jan. 19, 2017

(86) PCT No.: PCT/EP2017/051093
§ 371 (c)(1),
(2) Date: Aug. 3, 2018

(87) PCT Pub. No.: WO2017/133897
PCT Pub. Date: Aug. 10, 2017

(65) Prior Publication Data
US 2019/0039706 A1   Feb. 7, 2019

(30) Foreign Application Priority Data
Feb. 5, 2016   (GB) ..................................... 1602141

(51) Int. Cl.
*B63B 49/00* (2006.01)
*B63B 79/10* (2020.01)
*B63H 9/06* (2020.01)

(52) U.S. Cl.
CPC .............. *B63B 49/00* (2013.01); *B63B 79/10* (2020.01); *B63H 9/06* (2013.01); *G05B 2219/24048* (2013.01)

(58) Field of Classification Search
CPC ........... B63B 49/00; B63B 79/10; B63H 9/06; G05B 2219/24048
USPC ................................................................ 701/21
See application file for complete search history.

(56) References Cited

U.S. PATENT DOCUMENTS

| 5,877,415 A | 3/1999 | Kruse | |
| 2010/0138171 A1* | 6/2010 | George | G01M 9/06 |
| | | | 702/50 |
| 2012/0101669 A1 | 4/2012 | Spanhake | |
| 2013/0104786 A1 | 5/2013 | Brummer | |
| 2016/0364689 A1* | 12/2016 | Terry | H04L 67/12 |
| 2017/0090777 A1* | 3/2017 | Horn | G06F 3/0652 |

\* cited by examiner

*Primary Examiner* — Thomas E Worden
*Assistant Examiner* — Sean Patrick Reidy
(74) *Attorney, Agent, or Firm* — Laubscher & Laubscher PC

(57) ABSTRACT

A sensor apparatus for a sail includes a unique sail identifier and an in-use sensor, the in-use sensor determining whether the sail is in an in-use condition or a dormant condition. The in-use sensor includes a light sensor for measuring light falling on the sail and one or more accelerometers for measuring orientation and vibration of the apparatus, wherein an in-use condition is determined from reviewing whether measurements from the light sensor and one or more accelerometers exceed threshold values.

18 Claims, 5 Drawing Sheets

SENSOR APPARATUS FOR A SAIL AND ASSOCIATED SYSTEM

CROSS-REFERENCE TO RELATED APPLICATIONS

This application is a § 371 National Stage Entry of PCT/EP/051093 filed Jan. 19, 2018, PCT/EP/051093 claims priority to Patent Application No. GB1602141.2 filed Feb. 5, 2015. The entire content of these applications is incorporated herein by reference.

SUMMARY OF THE INVENTION

The present invention relates to sensor apparatus for identifying an article to which the sensor is coupled, and for relaying information relating to the conditions experienced at the sensor apparatus. The invention further relates to an associated system for using the sensor apparatus.

In this connection, the sensor apparatus is particularly directed to use with articles such as sails, where the apparatus can measure and log certain characteristics of the use of the sail.

In this connection, known sail sensor arrangements have previously been disclosed, for example in US2012/0101669. Such arrangements have however proved to be inadequate and an object of the present invention is to provide an improved apparatus that can be used in sail and other applications.

According to the present invention there is provided sensor apparatus for an article comprising: a unique apparatus identifier; and an in-use sensor, the in-use sensor determining whether the apparatus is in an in-use or a dormant condition, the in-use sensor comprising: a light sensor for measuring light falling on the apparatus; and one or more accelerometers for measuring orientation and vibration of the apparatus; wherein an in-use condition is determined from reviewing whether the measurements from the light sensor and accelerometers exceed threshold values. In this manner, the sensor apparatus of the present invention can be readily employed to reliably determine use characteristics.

Preferably, an in-use condition is determined when at least: i) the light sensor registers a value above a predetermined threshold value; and/or ii) the one or more accelerometers measure values for each of vibration and orientation above predetermined threshold values. As such, it will be recognised that a prime indication of being in-use relates to a threshold value of illumination being met, irrespective of orientation and vibration of the article. Moreover, if certain thresholds of both orientation and vibration are met, this is also considered to relate to an in-use condition, irrespective of whether a threshold value of illumination is met.

Preferably, the sensor apparatus further comprises a transceiver. In this way, communication with the apparatus can be achieved.

Conveniently, the transceiver periodically broadcasts sail data, so that the relevant databases can be updated accordingly.

Preferably, the apparatus is BLUETOOTH® compliant with short-range wireless technology standards for exchanging data with and between smart phones and tablet computers.

Conveniently, the apparatus further comprises a memory for storing data from said sensor components. In this way data can be stored to transmittal when suitable facilities are available.

Preferably, the sensor apparatus is mounted on a sail. The apparatus has particular application to sails and their upkeep.

Conveniently, the sensor apparatus further comprises a tamper evident means of fixing the apparatus to the sail material. The tamper evident means may include a stitching pattern arrangement.

According to a further aspect of the present invention there is provided a system for monitoring usage of an article by providing a sensor apparatus on an article to be monitored and collecting parameter data from the apparatus for evaluating historic and/or real time characteristics of the usage. Such a system allows monitoring of articles such as sails to be performed is in a more organised and efficient manner.

Preferably, the system further comprises transmitting said parameter data to a local or remote processor for analysis. The local processor may take the form of an app on a smartphone or a PC.

Data concerning a sensor apparatus may in this regard be cached on a smart phone or tablet locally where the correct permissions are in place, and wherein such data is revealed when the sensor apparatus is located. Such data can take the form of quick guide data relating to the sensor apparatus.

Conveniently, the system further comprises storing said parameter data to build a historic record of the article usage.

Preferably, the system further comprises a remote database of information built from data received from the apparatus.

Preferably, the apparatus data can be reviewed in real time so that a user has immediate information on the article should it be required.

Conveniently, the data is stored on the device in time segments and wherein preferably the time segments are longer for more historic data.

Conveniently, different levels of access to the data are provided so that access can be restricted for different users. For example, an owner of the article may have access to greater information than a potential purchaser of the article.

Preferably, the data comprises one or more of manufacturing information, serial number of sail, manufacturer, owners materials colour, location of device on sail, date of manufacture, date of purchase, date and type of repairs.

The apparatus data may be communicated to a mobile device in the vicinity of the apparatus, which data is then communicated by the mobile device to a remote server.

Preferably, the mobile device communicates said data by way of the internet or a mobile data network.

According to a further aspect of the present invention there is provided sensor apparatus for measuring one or more characteristics of a material, the apparatus comprising: a stretchable component having spaced fixing zones for fixing said stretchable component to said material; a rigid component anchored to the stretchable component at or adjacent one of the fixing zones and extending towards the other fixing zone, the stretchable component and the rigid component having one or more sensor components.

Examples of the present invention will now be described in detail with reference to the accompanying drawings, of which:

BRIEF DESCRIPTION OF THE DRAWINGS

In this connection, FIG. 1 shows a plan view from above of a sensor device 1 in accordance with the present invention. The sensor device is suitable for use with sails for sailing vessels such as dinghies and yachts. It may equally be used with architectural/structural rigging, marquees, livestock, or any article subjected to outdoor environmental conditions.

In this connection, when a sail is in use it suffers cumulative damage. A sail goes out of shape and so loses performance predominantly due to being used. Additionally the sail is damaged when it is exposed to ultraviolet light.

Further when a sail is allowed to flap in the wind, called 'flogging', a significant amount of damage can occur in a short period of time.

The apparatus and system of the present invention have been devised to be able to identify a particular article bearing the sensor apparatus and to recognise its usage and provide diagnostic means to quantify and record such usage for analysis.

In this respect, the apparatus takes the form of a thin flexible plaster-like device 1 that can be readily securely attached to sails, outdoor fabrics or even livestock to firstly identify the item, in order for the item to be able to relay its identity and other information about the item to the owner, agents, user or regulating authority.

For identification purposes the device may include a unique identification transponder (ID device).

Figure 1:
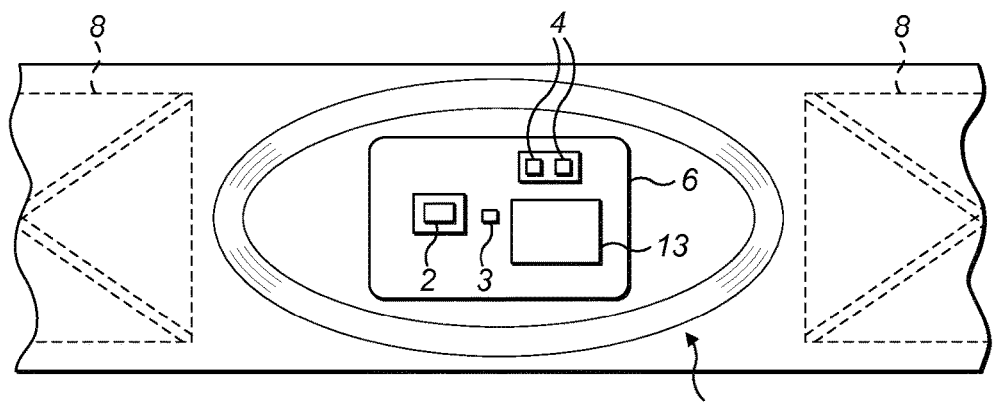
FIG. 1 shows a plan view from above of sensor apparatus according to the present invention.
Figure 2:
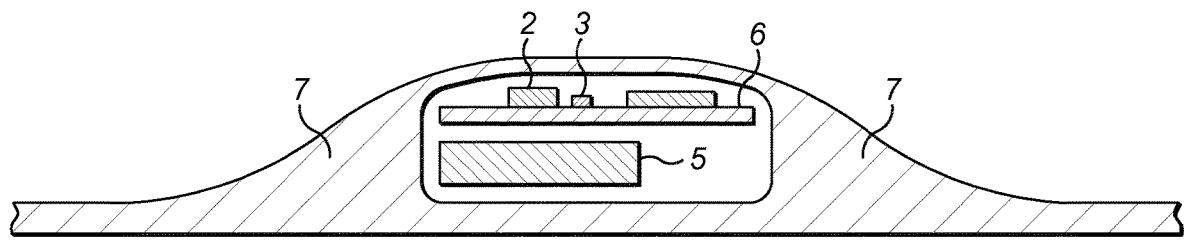
FIG. 2 shows a cross-sectional side view of the sensor apparatus of FIG. 1.
Figure 3:
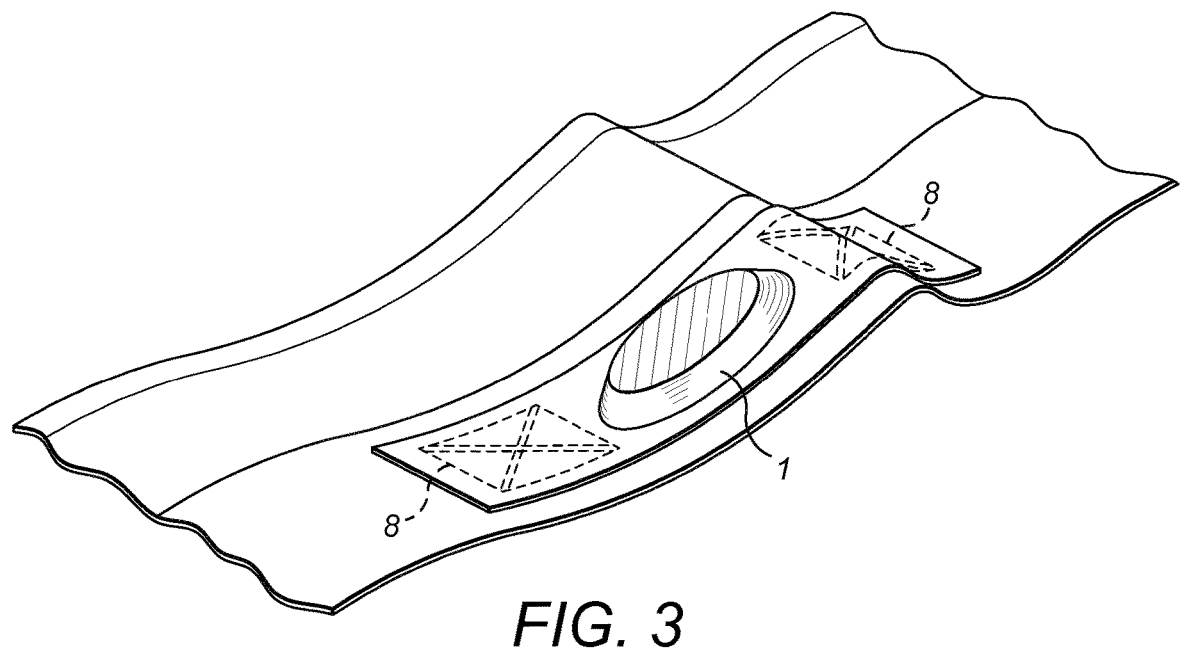
FIG. 3 shows a perspective view of a sail incorporating sensor apparatus of the present invention.

Further, a solar cell 2, a UV light sensor 3 as well as accelerometers 4 and a battery 5 are all mounted on a PCB 6 of the device, which is intended to have low power consumption. The PCB 6 is encapsulated in shock absorbing, waterproofing (IP68), UV protecting (BS EN 60945) silicon type rubber or gel 7 with the device 1 being stitched onto the clew on sails at stitching areas 8 with tamper proof/evident stitching. As shown in FIG. 2, the edges of the device are bevelled or tapered to prevent the device snagging or becoming caught in a vessel's fittings.

The sensor device is in this regard a small, light, hermetically sealed transponder. Whilst any suitable method of attachment may be used, stitching is preferred. The device includes its own energy source by way of the battery 5 which is rechargeable using the solar cell 2. The device is able to communicate with mobile phones by way of a wireless personal area network using short-range wireless technology standards for exchanging data between fixed and mobile devices using UHF radio waves having bands ranging from 2.402 to 2.48 GHz.

Additional secondary means of identification—such as a bar code, NFC tag or other means may be included.

The device can record and store data, and then transfer data to, for example, a smart mobile phone installed with a suitable mobile phone application.

In the preferred embodiment, a limited amount of processing is carried out on the device with the majority of processing being carried out remotely on the mobile phone app and or on a remote computer.

In use, the device captures data and pre-processes the data (to reduce volume of stored data) qualifies the data into various parameters and then stores it for transmission later.

Then the phone application picks it up and adds information such as location to collected data and a further stage of processing occurs. The app will then pass that onto the remote computer database which can do additional processing.

Quick guide data may be cached on the phone locally if the correct permissions are in place, with the data being revealed when an article bearing a sensor apparatus is located.

The PCB may additionally benefit from one or more of the following: a wireless personal area network, commonly known as a BLUETOOTH® connection, a clock, a micro controller, and a temperature sensor.

The device can broadcast a small amount of pre-programmed information about the article to which it is related to a mobile phone, for example by means of BLUETOOTH® Low Energy and/or Near Field (NF) Coupling RF links. The mobile phone may then analyse the data about a particular sail locally, upload the data to a suitable database, via the Internet, and retrieve additional data about the sail, which is stored on the database.

In addition to collecting data on the sails in a particular location, it is also intended that a user may use a smart phone or the like to locate specific sails from a storage facility in which many sails are stored.

Figure 4A:
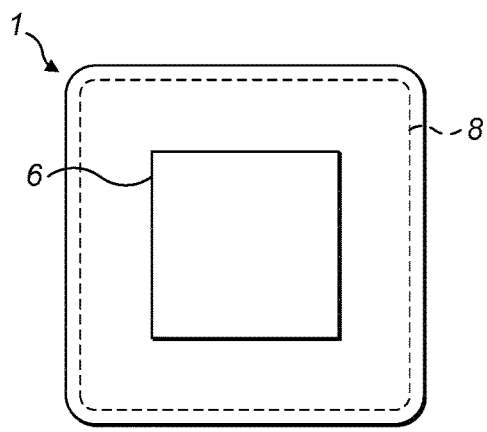
FIGS. 4A and 4B show plan and cross-sectional views of a second embodiment of sensor apparatus according to the present invention.
Figure 4B:
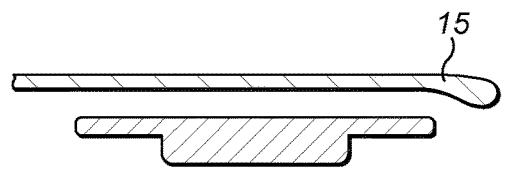

FIGS. 4A and 4B and 5A and 5B show further examples of the form the device may take. In FIGS. 4A and 4B, the device 1 is provided as a patch enclosing the PCB 6 and its components, with 4 sides that require stitching 8 to a sail 15.

Figure 5A:
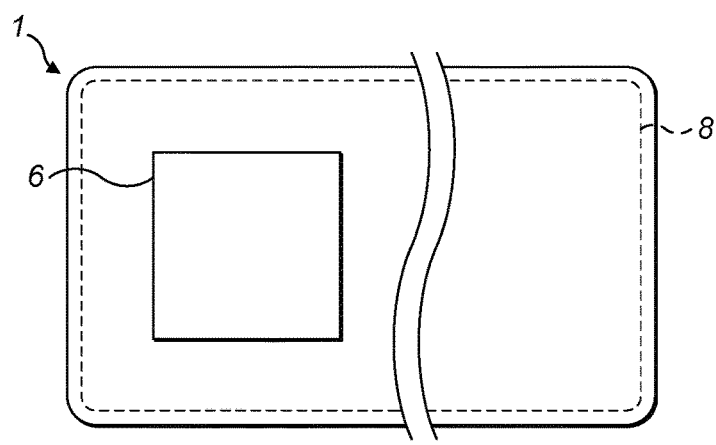
FIGS. 5A and 5B show plan and cross-sectional views of a third embodiment of sensor apparatus according to the present invention.
Figure 5B:
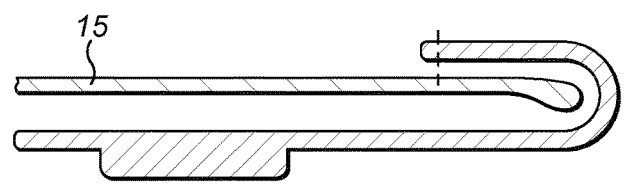

FIGS. 5A and 5B shows a configuration where the device 1 is provided on a flexible sheet material that cab be wrapped around, for example, the leech of sail 15 and stitched in position. The reverse side may be stitched first with the three remaining sides being stitched once the sail is flipped over.

Figure 6:
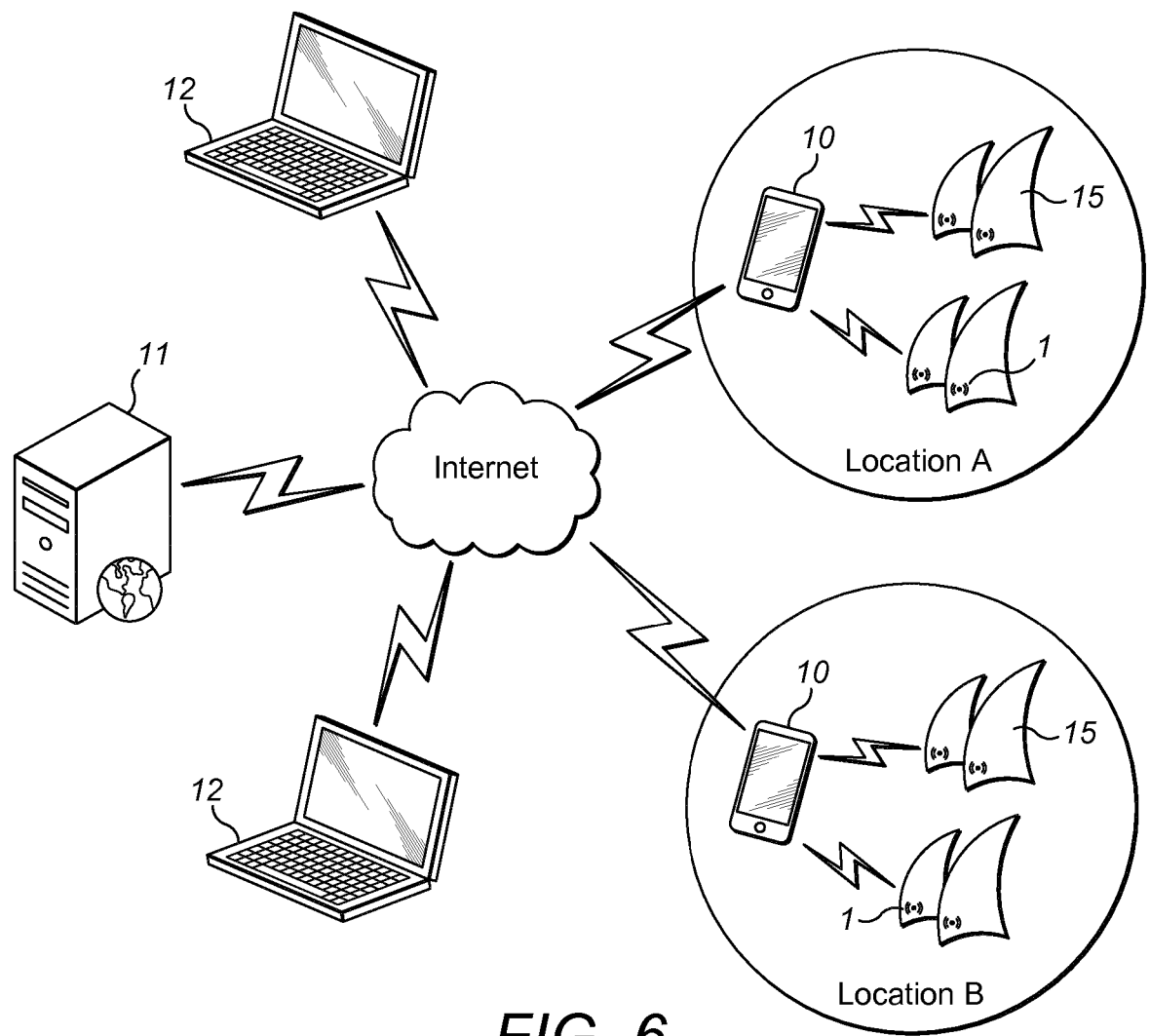
FIG. 6 shows a schematic view of the system of the present invention.

FIG. 6 shows a system for use in relation to the present invention. With the system of the present invention, users will be able to: identify a sail; locate a sail; track the history of a sail; monitor ongoing usage of the sail; conduct an inventory check; share information with other authorised users; and collect usage data for sail performance analysis.

In this respect, the system comprises three main components; the device 1 provided on an article such as a sail 15, a mobile phone application on a smart phone 10 and a cloud and client based database 11. Access to the database 11 may also be provided to PCs 12.

In addition to simple identification, the sensor device can collect useful data on the sail including one or more of the following, but not necessarily limited thereto: Recording the time a sail is in use; ultraviolet light exposure; a flogging log; a leech flutter log; inclination of the sail; recording gybe/tack times as a training aid; identify tack boat is on; record the time on each tack; wind flow analysis.

The sensor device may further include an NFC readable capability, in addition to a BLE interface 13.

The mobile phone application for use with the system is intended to run on smart phones and most smart phones supporting apple/android/windows mobile operating systems. The application can link the user's mobile phone to the sensor devices and the database.

In this connection, the sails "quick guide" data can be cached on the phone locally if the right permissions to have such data have been provided and installed. The data is revealed when the phone locates a smart sail device.

The data classes may be the following:

Data held on the device

Public data—ID number and boat name (anyone with a smart sail app can access this).

Usage data—all the data logs i.e. sail in use, UV measure, Flogging measure and inclination (anyone with a smart sail app and the appropriate level of authorisation can access this).

Data held on the cloud/client database

Personal and public data—(anyone with a smart sail app and the appropriate level of authorisation can access this)

Usage data—as above.

Depending upon the level of permissions, a user can access varying levels of data. Data transmitted by the device to the receiving authorised mobile phone will be encrypted.

When a mobile phone detects a sensor device, it is intended that the information of the "who" "when" and "where" will be recorded on the database. Location information will be determined from GPS, where possible, and by GPRS tracking where the GPS signal is too weak.

The database can record all information about the location, history and condition of sails which have been fitted with the sensor devices. The database can be accessed via the Internet and will work in conjunction with the mobile phone application.

Registered users will have a variety of levels of access, depending upon the type of account they have, and they will be able to share assess to the data with other users.

Whenever a user downloads sail information by means of their mobile phone and sensor devices, the data will be uploaded to the database to provide an ongoing history log for each sail.

The database will have a variety of pages to fit various target user markets and to allow correct pricing strategies for the target markets.

Using the sensors outlined above via various algorithms, one or more of the following features can be determined: recording the length of time a sail is "in use"; number of hours and levels of UV exposure; recording the length of time of flogs, the number of flogs and levels (gforce) of flogging; recording the length of time of leech flutters, number of leech flutters and levels (gforce) of leech flutter; the inclination of the sail: to identify what tack the boat is on and for use in determining an "in-use" condition; recording gybe/tack times as a training aid; record the time on each tack; and wind flow analysis.

In the case of a sail, it is generally considered to be "in-use" if either:

1. The sail is exposed to UV. Regardless of whether it is being sailed or not—UV exposure causes sail material degradation.
2. Sail is actually being used to sail a vessel and is undergoing stresses.

The determination of a sail "in use" is as such determined by the combination of signals from the following sensors:

Orientation (as determined by internal accelerometers picking up gravitational acceleration)

Vibration (as measured by the same or separate internal accelerometers)

UV exposure and determined by the following truth table:

| UV (above threshold) | Correct Sailing Orientation | Vibration above threshold | In use |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

Figure 7:
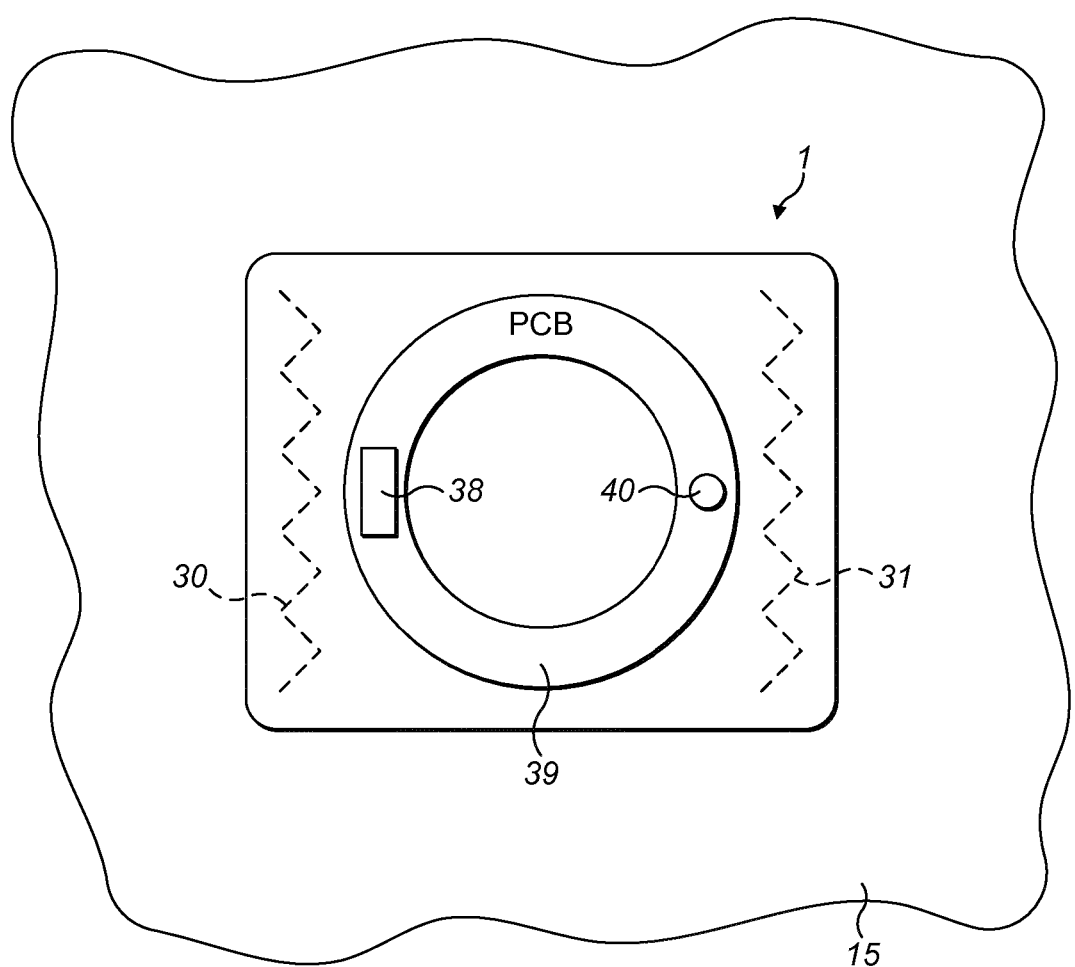
FIG. 7 shows a plan view from above of sensor apparatus according to a fourth embodiment of the present invention.
Figure 8:
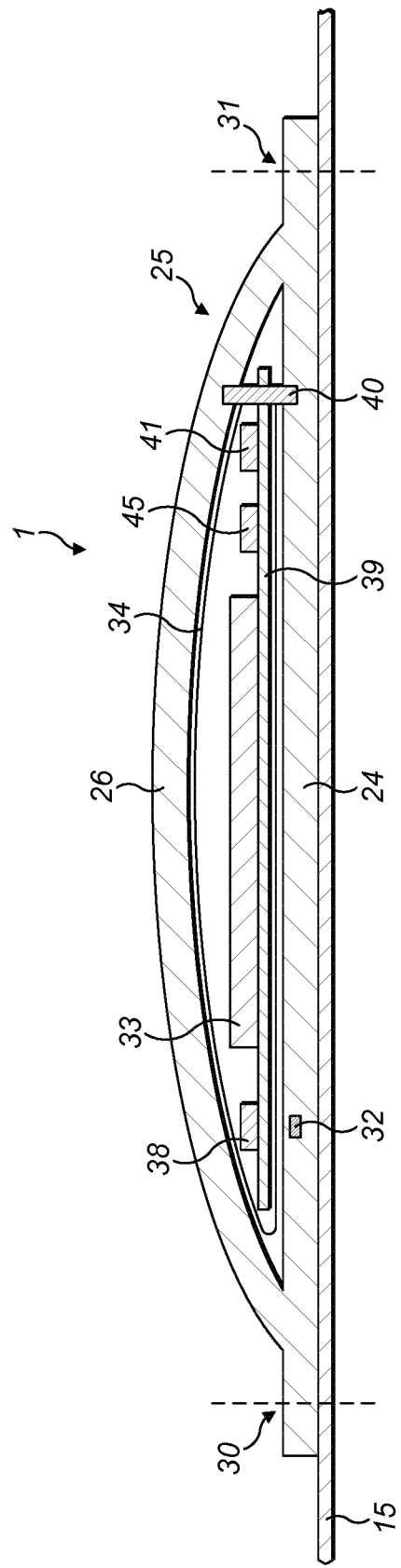
FIG. 8 shows a cross-sectional side view of the sensor apparatus of FIG. 7.

In a further embodiment, as shown in FIGS. 7 and 8, the device 1 can also measure if tension is applied thereto. More specifically, the device has a casing 25 made from a stretchable material. By stretchable, it is meant that the material is deformable, namely it will extend readily on application of a force. The material will be generally elastically deformable, i.e. it will return to its original length if the force is removed.

The stretchable material is chosen with a low modulus of elasticity so that it that will stretch with a substantially lower force than the sail material for the amount of stretch experienced during sailing. In other words, the stretchable material has a lower modulus of elasticity than that of the sail material in order that the data from the sensor is not distorted due to any forces imparted by the stretchable material itself.

The stretchable material may be any suitable material, such as a synthetic fiber, plastics, rubber or neoprene based material. Also, suitably coated or laminated fabrics may be used. In this connection, a sail typically stretches by around 1% of the unloaded length when the tension required for sailing is applied. The casing is hence attached to the sail 15 such that it stretches with the sail. As shown, the casing comprises a lower stretchable component 24 and a cover component 26. The lower stretchable component includes fixation zones 30, 31 which are spaced apart and where the device is fixed onto the sail material. In this regard, it is sufficient to attach the sensor device at two ends to measure the stretch, however the attachment can be more robust if the device is sewn on all sides.

The casing is shown stitched to the sail in the fixation zones. The pattern of stitching may in this regard be used as a tamper evidence mechanism, whereby tampering with the stitching would be readily apparent on inspection. The casing may be attached by alternative means, for example using suitable adhesives, which could be also used in addition to stitching.

The casing is sealed to prevent water salt and other environmental hazards from damaging the device. This may for example be achieved by injection moulding the case around the rest of the device.

As shown in FIG. 8, a magnet 32 is embedded in the lower stretchable component 24, close to one end of the case. A rigid component in the form of a printed circuit board (PCB) 39 is mounted inside the case with a magnetic Hall Effect sensor 38 in a position close to the embedded magnet when no stretch is applied to the sail. The opposite end of the printed circuit board 39 is mechanically anchored by pin 40 to the lower stretchable component of the case such that when stretch occurs the magnet moves with respect to the hall sensor. The PCB is rigid in the sense that retains it length as the stretchable component moves relative to it. In the present embodiment, the rigid component is disc shaped. However, the rigid component can take on any suitable alternative shape.

In order to prevent the printed circuit board from sticking to the case in unintended places, it is further encased in a pocket 34 that can slide against the outer casing of the cover 26 and lower stretchable component 24. The pocket may be formed of a low friction material.

A battery 33 sealed inside the casing supplies power to the device for its lifetime. The battery is housed centrally on the PCB which is circular in configuration to optimize its compactness. Whilst the battery is shown as being of a circular form, alternative kinds may be used as appropriate.

In this example, the measurement of stretch is determined from the variation in magnetic field strength observed by the Hall sensor. The output of the Hall sensor is observed either as a logic input to or as an analogue input to a System On a Chip (SOC) microprocessor.

In this connection, for ease of manufacture the sensor component associated with the stretchable component may be provided on a limb moulded onto the stretchable component, the limb extending into the vicinity of the sensor component on the rigid component. The limb would then move with the stretchable component relative to the rigid component.

With all embodiments, it will be appreciated that the casing may be made of a material that is sufficiently transparent to ultra-violet (UV) light for its measurement. Alternatively or additionally, a small window of a material such as ultraviolet transmitting acrylic may be provided. This window could for example be at the attachment point of the PCB. In this connection, a UV sensor 41 typically produces a Voltage dependent on the intensity of UV light, this Voltage can be measured by an analogue input to the SOC.

Whilst a UV sensor is shown in the present embodiment, a daylight sensor may take its place or be additionally provided.

Furthermore, a three dimensional accelerometer 45 is mounted on the PCB and can be used to measure the accelerations of the sail. The accelerometer is typically connected to the SOC via a serial bus. An inclinometer may additionally be provided.

For both embodiments, the device is arranged to periodically gather information from the sensors. For reasons of low power, the SOC will gather this information at a period of 2 to 5 seconds. This allows the processor and sensors to sleep in a low power state in the region of 1 uA between readings. The sensors can be powered from port pins of the SOC so that they can be fully powered down between readings. Depending on the mode of operation the sensors may not be read every information period. The key reason for the information period is to make a broadcast transmission of the serial number.

The broadcast transmission of serial number may be received to locate the sail when the sail is stored in, for example, a sail storage loft or a washing or drying area. The ID means of the sensor apparatus may be in the form of an RFID tag for identification purposes.

The invention encompasses in this regard an application on a mobile device which can report the signal strength of the received broadcasts such that when the mobile device is nearer to the sensing device the signal strength will typically increase.

The broadcast can also contain other sensor or logged data if this has been selected to be included in the broadcast.

The device is intended to remain operational for the lifetime of a sail, without replacing the battery. The life of a sail may be up to ten years. Data may be logged every few seconds. This would soon fill the memory of the SOC. The important information is how long the sail has been exposed to a particular stress. To do this a set of levels are defined for each measurement. Then the time that the sail is exposed to each stress level is counted. For any period of time the stress levels can be considered as a histogram. For recent time the histograms are stored in short time intervals. The intervals are then increased as the data becomes more historical. In this way the data storage is controlled. Immediate dynamic data can be available to a user to log or graph on a mobile during sailing. The user then can compare sailing performance for example after a race.

A BLUETOOTH® smart SOC can be used to allow connection to mobile phones. The broadcast can be used by a mobile phone to attempt to make an attachment to the SOC, such that further information may be obtained. The SOC is configured to accept connections from certain phones or phones that can provide a shared secret key information.

Different levels of access are provided for different types of users. For example, a purchaser may have an individual cryptographic key giving full read access and the ability to allow different information to other users. A central database system may also provide this key to the purchaser if the purchaser loses the key. The broadcast will provide at least a serial number.

One use scenario may be that a boat hire company purchases a sail with the device attached. The company allows the user that hires the boat to attach and see dynamic information on for example, the stretch, UV, 'flogging' accelerations, angle of the sensor, but only current information to his mobile phone or stored logged data for the previous 24 hours. This prevents a user from observing the use that has occurred with previous users. It also prevents the user from knowing that the sail is for example near the end of its life. The company can observe all the information and determine the life time of the sail and also any stress that a particular user has subjected the sail too. The user may for example have caught the sail in the water and substantially reduced the life of the sail.

When a sail is purchased but suffers damage under a warranty period, the manufacturer can access the logged data and determine if the damage has occurred while the sail was used within the terms of the warranty. The same applies to insurance against sail damage.

One aspect of the invention relates to a database that is kept centrally which contains information about every sail, including logged data, data of sale, owner and other identification numbers on the sail. The database may have different levels of access depending on the user, but can be useful to check the device has not been moved from sail to sail and if it is stolen. Manufacturing information may be of use when the sail needs repair. The logged information may indicate that the sail should be replaced because the performance will have reduced or that it may rip.

The sail may be under tension but not in use, for example a main sail furled to the mast or a jib or genoa furled to the forestay. Before furling it is good practice to reduce the tension in the sail, but commonly this is not done. Placing the device in the clew allows it to be exposed to UV light along with the sail. Measurement of when the sail is in use is then a combination of tension applied by a sheet (or outhaul for main sail) and 'flogging'. Importantly, it is considered that if the sail is furled but the clew is 'flogging' the sail is suffering damage so reducing its life.

The device measures 'flogging' by measurement of the acceleration of the sail. 'Flogging' causes an oscillatory acceleration. The device can be mounted in various places on the sail, when the sail is expected to remain under tension, such as a furled sail. For a sail that is furled at the front or luff of the sail the measurement will typically be made at the back or clew of the sail. When in the clew tension comes from the outhaul for a main sail or the sheet on a jib. The device measures the time at which particular types and levels of damage are occurring to the sail.

It will be appreciated that the present invention encompasses variants of features within the scope as defined. For example, alternative stretch sensor arrangements are possible. One such alternative uses capacitive technologies. As such, typically two copper plates may be provided on the bottom of the printed circuit board (PCB). A moving plate can be attached so that it moves with respect to the PCB as the sail stretches. The two plates on the PCB and the moving plate form two capacitors connected in series. One from the PCB to the moving plate and one from the moving plate back to the other plate on the PCB. If the starting position with no tension is such that the moving plate is just covering both PCB plates, as the sail is stretched and the moving plate moves such that one of the PCB plates is no longer fully covered, the capacitance between the uncovered PCB plate and the moving plate is reduced. This then reduces the overall capacitance because the two capacitors are in series.

Further a strain gauge may be used for measurement purposes. Such a strain gauge may be mounted on a strip attached to each end of the device, so that it measures the stretch. This can be measured as resistance in the material of the gauge is increased when it is elongated. The signal from this type of sensor is typically small, around 1 mV per applied Volt at full scale, so needs amplification.

Further a piezoelectric crystal produces a voltage when stress is applied in a particular direction. By attaching the crystal to points so that the stretch of the sail causes the stress the Voltage can be directly measured by the SOC analogue inputs. The crystal is very sensitive to movement so the attachment points would be close together or the stress reduced by connecting through a spring with lower stiffness than the sail.

It will be understood that the sensor device uniquely identifies the sail with a broadcast serial number. This can be used for the following purposes:

To check against the other numbers on the sail, because in racing it has been known for sailors to gaining advantage by declaring a lower performance sail or boat and changing the numbers on the sail so race organizers are not alerted to this. A database on the internet will contain the manufactures performance class specification, linked to the serial number.

To check ownership of a sail, i.e. that it has not been stolen. This is done with the combination of the serial number and a database available on the internet, containing additional information.

Sails are often stored in containers or shelving or hung up to be washed or dried. In this case there may be hundreds of sails that need to be tracked and located when they are needed. The regular transmission of the serial number will allow the use of an app on a mobile phone to locate the approximate position of a sail, such that the user can more easily find the sail. The app uses the fact that the signal strength falls away approximately as a function of distance.

When a sail is received for maintenance the serial number can be used to extract information from a database on the internet, giving the history of the sail. This can be used to determine what maintenance the sail requires.

The broadcast, for example in BLUETOOTH®, allows a mobile device (e.g. a smart phone) to make an attachment allowing two way communication to the device. This attachment will also allow downloading of information displayed on the sensor device, if the device allows it.

BLUETOOTH® attachment allows many features which may or may not be available to different users depending on their privileges. In this regard a mobile device user can receive real time information from the sensors in the device. This can be stored and displayed, as for example a graph, on an app in the mobile device. The user can compare performance of the boat and crew during or after a race. A mobile device user that has rented out the sail or the boat can moreover determine if the sail has been treated well, by downloading the logged information. Further a mobile device user that has sold a sail that is returned with a fault can check that the sail has not been abused. This information could also be provided to an insurance company when a claim is made.

In example of the present invention, data is being logged to memory. The data that is logged is preferably the time that the sail has received various stresses and the time at each intensity level of each stress is stored. The data is stored in a manner that it cannot be deleted by any user. The data may be compressed by combining time intervals of older data so that sufficient storage is available in the sensor device.

The present invention therefore encompasses the following aspects:

1) A device for determining the wear of a sail:
   The measurement of the exposure to ultra-violet light and/or daylight exposure:
   The measurement of vibration and orientation. From vibration frequency, direction and intensity the damage due to, for example, 'flogging' can be determined.
   The use of a 1-dimensional accelerometer.
   The use of a 3-dimensional accelerometer.
   The use of an inclinometer.
   The measurement of tension.

2) A device for locating a sail:
   The use of repetitive broadcast radio transmissions.
   The unique identification of the transmission such as a serial number.
   The use of a database of information on history of the sail.
   The use of means of viewing aspects of the database on a mobile device.

3) A device for measurement of sailing performance and crew skill:
   The measurement of vibration of the sail to view 'flogging' in real time.
   The measurement of the sensors three dimensional acceleration allowing determination of the angle of the sensor by means of trigonometry in real time.
   The measurement of stretch indicating trim of the sail in real time.
   The connection to a mobile device to display measurement information in near real time.
   The logging of measurement information in mobile device for later analysis of sailing performance.
   The charting of the measurement information to allow visualization of sailing performance.

4) Long term logging of measurements:
   The storage of periods of time between different levels of the measured value that have occurred. Such that a histogram of occurrence is formed for each time period.
   The subdivision of the logging into periods of time to minimize the total storage
   The combining of older time periods into long time periods to reduce logging storage.

For example: hourly for 1 week, then daily for 4 weeks, then weekly for 3 months, then monthly.

5) User categories:

User category will be determined by the device, by the ability of another device to pair with sensing device.

A configuration user is one with full read access to all information in the device. Access by means of a shared secret that is given to the user for example at time of purchase, but is also available from a central database, with suitable access permission to the database. This is typically the boat or sail owner, but this level of access may also be used when a sail in to be repaired. This information can also be used for insurance claims against manufactures warrantee. User does not have access to delete information. The configuration user can set the information that is available to other users.

Boat users will typically have real time information from the sensors but only access to the log data for limited period of history.

Any user will receive a broadcast of limited information such as the serial number and if the sail is considered to be in-use.

6) Tampering:

The device is stitched through the sail in such that the holes in the sail and in the device made by the sticking process are difficult to replicate. If the device is removed and placed on another sail or a new device placed on the sail this will be evident because the stitching does not go through all the holes that were made by the original stitching.

This allows the broadcast of the serial number to be used by for example race organizers to check that the sail is the one that is declared for entry in a race.

This allows the serial number to be used for identification of a stolen sail.

The device is made to be robust to normal use of a sail so that it will typically not need to be replaced in the life time of a sail.

7) Database:

The database may contain manufacturing information such as serial number of sail, manufacturer, owners materials colour, location of device on sail, date of manufacture, date of purchase, date and type of repairs. Log information downloaded from device, time stamped with when it was downloaded.

The database will have different levels of access, for original manufacturer, sail maintenance, race organizer, boat user and any user.

Infrastructure that relays information from a device to the database when it is connected via the internet.

Infrastructure that relays information from the various users depending on their access privileges.

8) Location of the device on any or more than one part of the sail:

Location of the device in the head of a sail where tension may be observed when the sail has been hoisted. In this location the tension in the sail can be measured even when the sail has been reefed.

Location in the clew of a sail that may be furled at the luff such that use may be determined by vibration or tension. Vibration when furled may still be considered as use. The clew of a sail furled at the luff will typically be exposed to the light, so measurement of ultra-violet light may be made by the device. A device in the head of a sail that is furled at the luff may still be in tension but not in-use.

Placing the devices in other parts of the sail will reveal the conditions of the sail in that area and typically not a summary of use of the entire sail. This may be done when more than one device is placed per sail.

Measurement of the tension and vibration of a telltale or telltales. A device of similar construction but measuring the lower tension in the telltale could provide information on when a telltale was experiencing lamina or turbulent air flow.

9) Communication method:

A device that provides information in broadcast radio transmissions.

A device where the radio connection is made to provide requested additional information.

A device where the information is communicated via wires.

10) Low power:

A device with sufficiently low power consumption that it can remain functional on the sail for the life of the sail. While remaining small enough to have a minimal effect on the performance of the sail. Additionally small enough that the storage of the sail is not effected.

The present invention can be used in any context where sails or material are under tension, for example sail boats, industrial rigging, architectural rigging, glass frontage/plexiglass, marquees, wire tensioning.

The invention claimed is:

1. Sensor apparatus for a sail, comprising:
   a unique sail identifier;
   a transceiver; and
   an in-use sensor, configured to detect whether the sail is in an in-use condition or a dormant condition, the in-use sensor including:
      a light sensor configured to:
         measure light falling on the sail,
         compare a measured light value falling on the sail to a predetermined light threshold value; and
         determine the sail is in the in-use condition when the measured light value is at or above the predetermined light threshold value; and
      at least one accelerometer configured to:
         awaken from a sleep mode to an active mode only when the measured light value of the light sensor is below the predetermined light threshold value, and otherwise remain in the sleep mode,
         in response to being awakened into the active mode, measure orientation and vibration of the sail,
         compare a measured orientation value of the sail to a predetermined orientation threshold value and compare a measured vibration value of the sail to a predetermined vibration threshold value,
         determine the sail is in the in-use condition when the measured orientation value is at or above the predetermined orientation threshold value and when the measured vibration value of the sail is at or above the predetermined vibration threshold value, and otherwise determine the sail is in the dormant condition, and
         return to the sleep mode when the measured light value falling on the sail is at or above the predetermined light threshold value.

2. The sensor apparatus as claimed in claim 1, wherein the transceiver periodically broadcasts sail data.

3. The sensor apparatus as claimed in claim 1, wherein the sensor apparatus is compliant with short-range wireless technology standards for exchanging data between fixed and mobile devices using UHF radio waves having bands ranging from 2.402 GHz to 2.48 GHz.

4. The sensor apparatus as claimed in claim 1, further comprising a memory for storing data received from the light sensor and the at least one accelerometer.

5. The sensor apparatus as claimed in claim 1, wherein the sensor apparatus is mounted on the sail.

6. The sensor apparatus as claimed in claim 5, wherein the sensor apparatus is fixed to the sail employing a stitching pattern arrangement configured to provide tamper evident indicia.

7. A system for monitoring usage of an article subjected to outdoor environmental conditions, comprising:
  a sensor apparatus configured to monitor the article subjected to the outdoor environmental conditions including a unique article identifier and an in-use sensor,
    the in-use sensor configured to detect whether the article is in an in-use condition or a dormant condition and including:
      a light sensor configured to:
        measure light falling on the article,
        compare a measured light value falling on the article to a predetermined light threshold value, and
        determine the article is in the in-use condition when the measured light value is at or above the predetermined light threshold value; and
      at least one accelerometer configured to:
        awaken from a sleep mode to an active mode only when the measured light value of the light sensor is below the predetermined light threshold value, and otherwise remain in the sleep mode,
        in response to being awakened into the active mode, measure orientation and vibration of the article,
        compare a measured orientation value of the article to a predetermined orientation threshold value and compare a measured vibration value of the article to a predetermined vibration threshold value,
        determine the article is in the in-use condition when the measured orientation value is at or above the predetermined orientation threshold value and when the measured vibration value of the article is at or above the predetermined vibration threshold value, and otherwise determine the article is in the dormant condition, and
        return to the sleep mode when the measured light value falling on the article is at or above the predetermined light threshold value;
  wherein the sensor apparatus is further configured to:
    associate parameter data with measurements taken by the in-use sensor each time the article is determined to change from the dormant condition to the in-use condition and each time the article is determined to change from the in-use condition to the dormant condition, wherein the parameter data includes at least timestamps for when measurements are taken, and
    evaluate historic and/or real time characteristics of the usage of the article by analyzing the measurements taken by the in-use sensor and the associated parameter data.

8. The system of claim 7, wherein the sensor apparatus is further configured to transmit the parameter data and/or the measurements taken by the in-use sensor to a local or remote processor for the analyzing.

9. The system of claim 7, wherein the system further comprises a memory configured to store the parameter data and/or the measurements taken by the in-use sensor to build a historic record of the usage of the article.

10. The system as claimed in claim 7, wherein the sensor apparatus is further configured to periodically transmit the parameter data and/or the measurements taken by the in-use sensor.

11. The system as claimed in claim 8, wherein each transmission of the parameter data and/or the measurements taken by the in-use sensor includes a unique identifier.

12. The system as claimed in claim 8, further comprising a remote database of information built from the parameter data and/or the measurements taken by the in-use sensor received from the sensor apparatus.

13. The system as claimed in claim 7, wherein the parameter data and/or the measurements taken by the in-use sensor can be reviewed in realtime.

14. The system as claimed in claim 7, wherein the sensor apparatus further comprises a memory configured to store the parameter data and/or the measurements taken by the in-use sensor in time segments, and wherein the time segments are longer for more historic data.

15. The system as claimed in claim 7, wherein different levels of access to the parameter data and/or the measurements taken by the in-use sensor are provided so that access can be restricted for different users.

16. The system as claimed in claim 7, wherein the parameter data comprises at least one of manufacturing information, article serial number, article manufacturer, article owner, article materials color, location of the sensor apparatus on the article, date of article manufacture, date of article purchase, and date and type of article repairs.

17. The system as claimed in claim 7, wherein
  the system further comprises a mobile device within communication range of the sensor apparatus,
  wherein the mobile device is configured to receive the parameter data and/or the measurements taken by the in-use sensor,
  wherein the mobile device is further configured to communicate the parameter data and/or the measurements taken by the in-use sensor to a remote server, and
  wherein the mobile device is further configured to communicate the parameter data and/or the measurements taken by the in-use sensor by way of the internet or a mobile data network.

18. The system as claimed in claim 7, wherein
  the system further comprises a smart phone or tablet within communication range of the sensor apparatus,
  wherein the smart phone or tablet is configured to receive and cache the parameter data and/or the measurements taken by the in-use sensor,
  wherein the smart phone or tablet is further configured to require permissions be in place in order to enable access to the parameter data and/or the measurements taken by the in-use sensor, and
  wherein the permissions at least include knowing a specific location of the sensor apparatus.

* * * * *